United States Patent
Gschwend

[11] 3,725,431
[45] Apr. 3, 1973

[54] 1-ARALKYL-3-AMINOINDAZOLES

[75] Inventor: Heinz Werner Gschwend, Millburn, N.J.

[73] Assignee: Ciba-Geigy Corporation, Ardsley, N.Y.

[22] Filed: Sept. 23, 1970

[21] Appl. No.: 74,838

[52] U.S. Cl........260/310 C, 260/239 B, 260/239 E, 260/268 R, 260/268 BC, 260/293.6, 260/293.78, 260/293.79, 260/295.51, 260/311, 260/326.3, 260/326.85, 260/564 R, 424/267, 424/250, 424/273
[51] Int. Cl.............................................C07d 49/20
[58] Field of Search..........260/310 C, 293.6, 268 BC

[56] References Cited

UNITED STATES PATENTS 3,133,081  5/1964  Lafferty et al. ..................260/310 C
3,329,680  7/1967  Hofmann et al. ................260/310 C

FOREIGN PATENTS OR APPLICATIONS 1,246,746  8/1967  Germany ..........................260/310 C Primary Examiner—Natalie Trousof
Attorney—Harry Goldsmith, Joseph G. Kolodny and Mario A. Monaco

[57] ABSTRACT

1-Aralkyl-3-aminoindazoles, e.g. those of the formula

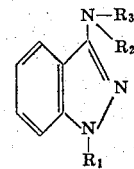

$R_1$ = aralkyl
$R_2$ = H, alkyl, free, esterified or etherified hydroxyalkyl
$R_3$ = aza-(alkyl, cycloalkyl-alkyl, aralkyl, alkanoyl, cycloalkyl-alkanoyl or aralkanoyl)
and salts thereof are antiinflammatory agents.

5 Claims, No Drawings

1-ARALKYL-3-AMINOINDAZOLES

SUMMARY OF THE INVENTION

The present invention concerns and has for its object the provision of new 1-aralkyl-3-aminoindazoles, more particularly of those of Formula I

(I)

in which Ph is a 1,2-phenylene radical, $R_1$ is a lower aralkyl radical, $R_2$ is hydrogen, lower alkyl or free, esterified or etherified hydroxyalkyl, $R_3$ is an aza-(lower alkyl, cycloalkylalkyl, aralkyl, alkanoyl, cycloalkylalkanoyl or aralkanoyl) group, in which

group the heteroatoms are separated by at least 2 carbon atoms, or acyl derivatives, quaternaries or salts thereof, and methods for the preparation of said compounds; as well as corresponding pharmaceutical compositions, their preparation and use. The compounds of the invention possess antiinflammatory activity and are useful for this purpose.

DESCRIPTION OF THE PREFERRED EMBODIMENTS

The 1,2-phenylene radical Ph is unsubstituted or substituted by one or more than one, preferably by 1 or 2, of the same or of different substituents, for example, by lower alkyl, such as methyl, ethyl, n- or i-propyl or -butyl; free or etherified hydroxy or mercapto groups, such as lower alkoxy or alkylmercapto, e.g. methoxy, ethoxy, n- or i-propoxy or -butoxy; halo, e.g. fluoro, chloro or bromo; trifluoromethyl; nitro, or amino, especially di-lower alkylamino, e.g. dimethylamino or diethylamino. Preferred 1,2-phenylene radicals Ph are 1,2-phenylene, (lower alkyl)-1,2-phenylene, (lower alkoxy)-1,2-phenylene, (lower alkylmercapto)-1,2-phenylene, (halo)-1,2-phenylene, (trifluoromethyl)-1,2-phenylene, (nitro)-1,2-phenylene or (di-lower alkylamino)-1,2-phenylene. The term "lower" referred to above and hereinafter in connection with organic radicals or compounds respectively, defines such with up to seven, preferably up to four, carbon atoms.

A lower aralkyl radical $R_1$ is preferably represented by Ar—$C_mH_{2m}$, wherein $m$ is an integer from 1 to 4 and Ar is a phenyl radical, unsubstituted or substituted by one or more than one, preferably one or two of the same or different substituents, e.g. those mentioned above, attached to any of the positions available for substitution. Preferred radicals Ar—$C_mH_{2m}$ are those, wherein $m$ is an integer from 1 to 2, and Ar is phenyl, (lower alkyl)-phenyl, (lower alkoxy)-phenyl, (lower alkylmercapto)-phenyl, (halo)-phenyl, (trifluoromethyl)-phenyl, (nitro)-phenyl or (di-lower alkylamino)-phenyl.

A lower alkyl group $R_2$ is, for example, such mentioned above, but also n- or i-pentyl, n-hexyl or n-heptyl. A lower hydroxyalkyl radical $R_2$ is any of the above-mentioned alkyl radicals containing in any position of the chain, which is separated from the adjacent nitrogen atom by at least 2 carbon atoms, one hydroxy group. The latter may be esterified, e.g. by a lower alkanoic acid, e.g. acetic, propionic, butyric or pivalic acid, or etherified, e.g. by a lower alkanol.

An aza-(lower alkyl, cycloalkyl-alkyl or aralkyl) radical $R_3$ is, for example, amino-lower alkyl, mono- or di-lower alkylamino-lower alkyl, lower alkyleneimino-lower alkyl, monoaza-lower alkylene-imino-lower alkyl, 3 to 7 ring-membered cycloalkylamino-lower alkyl, cycloalkyl-lower alkylamino-lower alkyl, N-cycloalkyl-N-lower alkyl-amino-lower alkyl or N-cycloalkyl-lower alkyl-N-lower alkylamino-lower alkyl, Ar-lower alkylamino-lower alkyl or N-lower alkyl-N-Ar-lower alkylamino-lower alkyl, e.g. ω-[amino, methylamino, ethylamino, N- or i-propylamino or n-butylamino; dimethylamino, N-methyl-N-ethylamino, diethylamino, di-n-propylamino, di-isopropyl-amino or di-n-butylamino, ethyleneimino, pyrrolidino, 2-methyl-pyrrolidino, piperidino, 2- or 4-methyl-piperidino, 1,6- or 2,5-hexyleneimino, 1,7- or 2,6-heptyleneimino, piperazino, 4-(methyl or ethyl)-piperazino, cyclopropylamino, cyclopentylamino, cyclohexylamino, cyclopropylmethylamino, 2-cyclopentylethylamino, N-cyclopentyl-N-methylamino, N-cyclohexyl-N-methylamino, N-cyclo-hexyl-N-ethylamino, N-cyclopentylmethyl-N-ethylamino, benzylamino, 1- or 2-phenethylamino, N-methyl-N-benzylamino or N-ethyl-N-benzyl-amino]-ethyl, -propyl, -butyl or -pentyl. The aza-(lower alkanoyl, cycloalkylalkanoyl or aralkanoyl) radicals $R_3$ are, for example, the above-substituted alkyl radicals, in which the carbon atom, attached to the 3-amino nitrogen atom, is substituted by an oxo group. In the above amino groups two hetero atoms are separated by at least 2 carbon atoms.

Acyl derivatives of the compounds of Formula I in which $R_2$ is hydrogen and $R_3$ is aza-(alkyl, cycloalkylalkyl or aralkyl), are preferably those derived from lower alkanoic or Ar-lower alkanoic acids, such as the acetyl, propionyl, butyryl, pivalyl, benzoyl or phenylacetyl derivatives. Quaternaries are preferably lower alkyl- or Ar-lower alkylammonium salts, such as halides, sulfates or sulfonates, e.g. methyl-, ethyl- or benzylammonium chlorides, bromides, iodides, methyl- or ethylsulfates, methane, ethane or p-toluene sulfonates.

The compounds of the invention exhibit valuable pharmacological properties. Apart from diuretic activity, they exhibit primarily antiinflammatory effects, as can be demonstrated in animal tests, using advantageously mammals, e.g. rats, as test animals. They can be applied enterally, parenterally or topically, for example orally in the form of aqueous solutions or suspensions by stomach tube, in the dosage range between about 0.1 and 100 mg/kg/day, preferably between about 0.5 and 50 mg/kg/day, advantageously between about 1 and 30 mg/kg/day. The antiinflammatory effects can be determined, for example, in the rat paw edema test system [Winter et al, Proc. Soc. Exp. Biol. & Med. 111, 544 (1962)]. Thus, for example, 1-benzyl-3-(3-dimethylaminopropylamino)-indazole hydrochloride, a characteristic compound of the present invention, causes in the above doses in the rat paw edema test an inhibition of the paw edema induced by carrageenin. Accordingly, the compounds of this invention are useful antiphlogistics, for example, in the treatment or management of dermatopathologic conditions, as well as useful intermediates in the manufacture of other valuable products, primarily of pharmacologically active compounds.

Preferred are the compounds of Formula I, in which Ph is unsubstituted phenylene or phenylene substituted by up to 2 members selected from the group consisting of lower alkyl, hydroxy, mercapto, lower alkoxy, lower alkylmercapto, halo, trifluoromethyl, nitro, amino and di-lower alkylamino, $R_1$ is $Ar-C_mH_{2m}$, wherein $m$ is an integer from 1 to 4 and Ar is unsubstituted phenyl or phenyl substituted by up to 2 members of the group mentioned for Ph, $R_2$ is hydrogen, lower alkyl, hydroxy-lower alkyl, lower alkanoyloxy-lower alkyl or lower alkoxy-lower alkyl, $R_3$ is amino-lower alkyl or -alkanoyl, mono- or di-lower alkylamino-lower alkyl or -alkanoyl lower alkyleneimino-lower alkyl or -alkanoyl, monoaza-lower alkylene-imino-lower alkyl or -alkanoyl, 3 to 7 ring-membered cycloalkylamino-lower alkyl or -alkanoyl, cycloalkyl-lower alkylamino-lower alkyl or -alkanoyl, N-cycloalkyl-N-lower alkylamino-lower alkyl or -alkanoyl, N-cycloalkyl-lower alkyl-N-lower alkylamino-lower alkyl or -alkanoyl, Ar-lower alkylamino-lower alkyl or -alkanoyl or N-lower alkyl-N-Ar-lower alkylamino-lower alkyl or -alkanoyl, in which

group the heteroatoms are separated by at least two carbon atoms, or the lower alkanoyl or Ar-lower alkanoyl derivatives of the compounds in which $R_2$ is hydrogen and $R_3$ is aza-(lower alkyl, cycloalkylalkyl or aralkyl), or their lower alkyl or Ar-lower alkyl quaternaries or acid addition salts.

Particularly useful are the compounds of Formula I, in which Ph is 1,2-phenylene, (lower alkyl)-1,2-phenylene, (lower alkoxy)-1,2-phenylene, (lower alkylmercapto)-1,2-phenylene, (halo)-1,2-phenylene, (trifluoromethyl)-1,2-phenylene, (nitro)-1,2-phenylene or (di-lower alkylamino)-1,2-phenylene, $R_1$ is $Ar-C_mH_{2m}$, wherein m is an integer from 1 to 2 and Ar is phenyl, (lower alkyl)-phenyl, (lower alkoxy)-phenyl, (lower alkylmercapto)-phenyl, (halo)-phenyl, (trifluoromethyl)-phenyl, (nitro)-phenyl or (di-lower alkylamino)-phenyl, $R_2$ is hydrogen, lower alkyl, hydroxy-lower alkyl, lower alkanoyloxy-lower alkyl or lower alkoxy-lower alkyl, $R_3$ is (amino, mono- or di-lower alkylamino, lower alkyleneimino, monoaza-lower alkyleneimino, 3 to 7 ring-membered cycloalkylamino, cycloalkyl-lower alkylamino, N-cycloalkyl-N-lower alkylamino, N-cycloalkyl-lower alkyl-N-lower alkylamino, Ar-lower alkylamino or N-lower alkyl-N-Ar-lower alkylamino)-lower alkyl or -laknaoyl, in which

group the heteroatoms are separated by at least 2 carbon atoms, or the lower alkanoyl or Ar-lower alkanoyl derivatives of the compounds in which $R_2$ is hydrogen and $R_3$ is aza-(lower alkyl, cycloalkylalkyl or aralkyl) or the lower alkyl or Ar-lower alkyl quaternaries or acid addition salts thereof.

More preferred are the compounds of Formula II

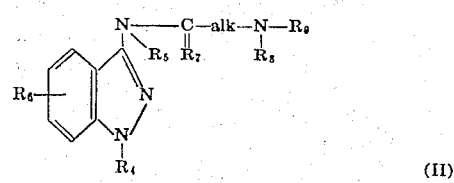

(II)

wherein $R_4$ is benzyl, (lower alkyl)-benzyl, (lower alkoxy)-benzyl, (halo)-benzyl or (trifluoromethyl)-benzyl, $R_5$ is hydrogen or lower alkyl, $R_8$ is hydrogen or lower alkyl, $R_9$ is lower alkyl, or $R_8$ and $R_9$ together with the nitrogen to which they are attached, are 5 to 7 ring-membered lower alkyleneimino, piperazino or 4-(methyl or ethyl)-piperazino, alk is alkylene with up to four carbon atoms, $R_7$ is oxo or 2 hydrogen atoms and $R_6$ is hydrogen or halo, or therapeutically useful acid addition salts thereof.

Especially valuable are the compounds of Formula II wherein $R_4$ is benzyl, 4-(methyl or chloro)-benzyl, $R_5$ is hydrogen or methyl, $R_8$ is hydrogen, methyl or ethyl, $R_9$ is methyl or ethyl, or $R_8$ and $R_9$ together with the nitrogen, to which they are attached, are pyrrolidino, piperidino, piperazino, 4-methylpiperazino or 4-ethylpiperazino, alk is methylene, 1,1- or 1,2-ethylene, $R_7$ is oxo or 2 hydrogens and $R_6$ is hydrogen, or therapeutically useful acid addition salts thereof. Above all, the compounds of Formula II are preferred, wherein $R_4$ is benzyl, $R_5$ is hydrogen, $R_8$-N-$R_9$ is dimethylamino or pyrrolidino, alk is 1,2-ethylene, $R_7$ is 2 hydrogens and $R_6$ is hydrogen, or said salts thereof.

The compounds of the invention are prepared according to methods in themselves known. Advantageously they are obtained by: a) converting in a compound of the formula

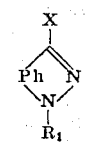

in which X is a substituent capable of being converted into

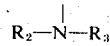

X into said amino group;
b. converting in a compound of the formula

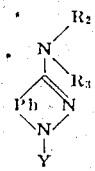

in which Y is a substituent capable of being converted into $R_1$, Y into $R_1$ or
c. ring-closing a compound of the formula

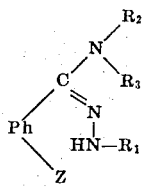

in which Z is a substituent capable of being eliminated as ZH or an alkali metal salt thereof and, if desired, converting any resulting compound into another compound of the invention.

A substituent X capable of being converted into

is, for example, the

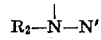

group. The corresponding starting material, or an alkali metal salt thereof, is reacted with a reactive derivative of the alcohol, or advantageously the acid R₃—OH, preferably a halide, e.g. chloride or bromide, sulfate or sulfonate, e.g. methane, ethane, benzene or p-toluene sulfonate, or anhydride respectively.

Another substituent X is, for example, the

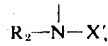

group, wherein X' is a substituent capable of being converted into R₃, e.g. a) reactively esterified hydroxyalkyl or -alkanoyl, e.g. said halo-or sulfonyloxyalkyl or -alkanoyl, or b) a (nitro, oximino, imino, cyano, carbamoyl, isocyanato or esterified carboxyamino, e.g. carbalkoxyamino)-alkyl, -alkenyl, -alkanoyl or -hydroxyalkyl group. The starting material containing the X' mentioned under item a) is reacted with ammonia, a corresponding amine or an alkali metal salt thereof, whereas that containing the X' mentioned under item b) is reduced and/or hydrolyzed, e.g. with the use of catalytically activated or nascent hydrogen, such as hydrogen in the presence of nickel, palladium or platinum catalysts or generated during electrolysis or in the reaction of metals, e.g. sodium or zinc, with hydrogen donors, e.g. lower alkanols or mineral acids respectively, or the use of reducing agents, such as simple or complex light-metal hydrides, advantageously boron hydrides or alkali metal aluminum hydrides, e.g. lithium aluminum hydride. The above isocyanates or urethanes can also be subjected to hydrolysis, e.g. with the use of aqueous mineral acids or alkalies.

A substituent Y, capable of being converted into R₁ is, for example, a lower aralkanoyl group, preferably such represented by

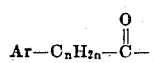

wherein $n = m-1$ and $m$ and Ar are as defined above. The corresponding starting material is reduced with the use of carbonyl reducing agents, such as simple or complex light-metal hydrides, for example, such mentioned above, advantageously lithium aluminum hydride.

A substituent Z, capable of being eliminated as ZH or as an alkali metal salt thereof, is preferably amino or halo, e.g. bromo or chloro. The corresponding starting material is ring-closed either on heating or in the presence of a condensing agent, such as a strong base, for example, alkali metal hydrides or hydroxides, preferably sodium hydride.

The compounds of the invention so obtained can be converted into each other according to known methods. For example, resulting compounds containing a primary or secondary amino group, can be reacted with a reactive ester of a corresponding alcohol, e.g. lower alkanol or alkanediol, or can be acylated, for example, with a reactive functional derivative of a corresponding acid, such as a halide or anhydride thereof. Resulting acyl derivatives can be hydrolyzed, for example, with the use of acidic or alkaline hydrolyzing agents, or advantageously reduced, e.g. with said simple or complex light metal hydrides. Resulting tertiary amines can be quaternized in the usual manner, for example, with the use of reactive esters of the corresponding alcohols, preferably of lower alkanols, but also of Ar-lower alkanols, and said hydrohalic, sulfuric or sulfonic acids.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchanges. Free bases that are obtained can be converted into salts by reaction with organic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxy- benzoic, salicylic, 4-aminosalicyclic, embonic, nicotinic, methane-sulfonic, ethanesulfonic, hydroxyethanesulfonic, ethylenesulfonic, benzenesulfonic, p-toluenesulfonic, halobenzenesulfonic, sulfanilic and cyclohexylsulfamic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, can be prepared according to known methods. For example, that mentioned under item a) in which X is primary amino, can be obtained by converting an isatin to the 3-carbomethoxyindazole according to the method described in Chem. Ber., 52, 1340 (1919). The indazole is then reacted with an $R_1$halide, e.g. chloride or bromide, saponifying the esters thereof, and separating the 1-$R_1$-indazole-3-carboxylic acid from the 2-substituted compound essentially as described in Chem. Ber., 54, 1738 (1921). Said 1-$R_1$-indazole-3-carboxylic acid is then subjected to Curtius degradation, i.e. converted into its halide with the use of thionyl or phosphorus halides, e.g. thionyl chloride or phosphorus oxychloride, the halide reacted with sodium azide, the resulting azide rearranged into the isocyanate or urethane by heating it in the presence or absence of an alcohol, e.g. lower alkanol, and hydrolyzing them to the 3-amines with the use of aqueous alkalies, e.g. potassium hydroxide. Said amine can then be reacted with a lower alkanoic acid or free or etherified hydroxy-alkanoic acid, and the amide formed reduced with said light metal hydrides, to yield the compounds in which X is H—N—$R_2$. These can further be reacted either with reactive derivatives of the alcohol or acid X'-OH (analogous to those of the formula $R_3$—OH) or with ethylene oxide. Any resulting 3-hydroxyalkylamino or -alkanoylamino compound can be reactively esterified, e.g. with thionyl or sulfonyl halides, or oxidized to the corresponding aldehydes, ketones or acids, for example, with hydrogen peroxide, alkali metal chromates or permanganates, mercuric, manganese or silver oxide in acidic or alkaline media. Resulting haloalkyl compounds can be reacted with silver nitrite or alkali metal cyanides, or resulting acids converted into the corresponding amides or azides as shown above, or the aldehydes or ketones reacted with ammonia, amines or hydroxylamine, in order to obtain the nitro compound, nitrile, the Schiff's base, oxime, isocyanate or urethane starting material.

The starting material mentioned under item b) in which Y is a lower aralkanoyl group, can be obtained by reacting a corresponding 1-unsubstituted-3-aminoindazole obtained analogously as shown under item a) with a reactive derivative of a lower aralkanoic acid, such as a halide, e.g. the bromide or chloride, or a simple or mixed anhydride thereof.

The starting material mentioned under item c) can be obtained by reacting the compound of the formula

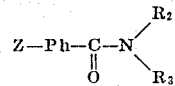

preferably such wherein $R_3$ is an aza-(lower alkyl, cycloalkyl or aralkyl) group; with $R_1$—NH—$NH_2$.

The pharmacologically active compounds of the invention are useful in the manufacture of pharmaceutical compositions comprising an effective amount thereof in conjunction or admixture with excipients suitable for either enteral, parental or topical application. Preferred are tablets and gelatin capsules comprising the active ingredient together with a) diluents, e.g. lactose, dextrose, sucrose, mannitol, sorbitol, cellulose and/or glycine, b) lubricants, e.g. silica, talcum, stearic acid, its magnesium or calcium salt and/or polyethyleneglycol, for tablets also c) binders, e.g. magnesium aluminum silicate, starch paste, gelatin, tragacanth, methylcellulose, sodium carboxymethylcellulose and/or polyvinyl-pyrrolidone, if desired, d) disintegrants, e.g. starches, agar, alginic acid or its sodium salt, enzymes of the binders or effervescent mixtures and/or e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50%, of the active ingredient.

The following examples are intended to illustrate the invention and are not to be construed as being limitations thereon. Temperatures are given in degrees Centigrade, and all parts wherever given are parts by weight.

EXAMPLE 1

Through the solution of 20 g 1-benzyl-3-(3-bromopropionylamino)-indazole in 550 ml tetrahydrofuran, a slow stream of dimethylamine is passed while stirring, until saturation has been reached. The mixture is stirred for 16 hours at room temperature, filtered and the filtrate evaporated in vacuo. The residue is taken up in methylene chloride, the solution washed with aqueous sodium bicarbonate, dried, filtered and evaporated, to yield the 1-benzyl-3-(3-dimethylaminopropionylamino)-indazole of the formula

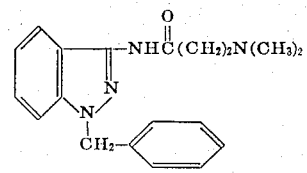

It is taken up in acetone and the solution neutralized with ethereal hydrogen chloride, to yield the corresponding hydrochloride, melting at 165°–166°.

The starting material is prepared as follows: The mixture of 22 g 1-benzyl-indazole-3-carboxylic acid and 150 ml thionyl chloride is refluxed for 1½ hours. The excess thionyl chloride is evaporated in vacuo. The residue is dissolved in 200 ml acetone and the solution cooled, whereupon the solution of 42 g sodium azide in 200 ml water is added. The resulting mixture is stirred for 2 hours. Crushed ice is added and in the mixture stirred an additional 1-½ hours. The azide is collected on a filter and vacuum dried at room temperature. The azide is taken up in 700 ml ethanol, the solution refluxed for 20 hours, concentrated to half its volume and then refluxed for 20 hours with 200 ml 30 percent aqueous potassium hydroxide. The ethanol is evaporated in vacuo and water is added to the residue. The solids are collected on a filter and dried, yielding the 1-benzyl-3-aminoindazole, melting at 114°–116°.

To the mixture of 16.9 g thereof and 10 g sodium bicarbonate in 700 ml methylene chloride are added 14.3 g 3-bromo-propionyl chloride. The resulting mixture is stirred for 16 hours at room temperature, diluted with water, acidified with 2N aqueous hydrochloric acid and then made basic with sodium carbonate. The organic phase is separated, dried and evaporated. Recrystallization of the residue from methylene chloride-diethyl ether affords the 1-benzyl-3-(3-bromopropionylamino)-indazole, melting at 100°–101°.

EXAMPLE 2

The solution of 14.6 g 1-benzyl-3-(3-dimethylaminopropionylamino)-indazole in 450 ml tetrahydrofuran is added dropwise to 98 ml of a 1 molar solution of borane in tetrahydrofuran while stirring at 0° under nitrogen. The mixture is then refluxed for 4 hours, cooled and carefully combined with 70 ml 5N hydrochloric acid. It is concentrated at atmospheric pressure, the concentrate made basic with saturated aqueous sodium carbonate and extracted with methylene chloride. The extract is dried, filtered and evaporated. The residue is taken up in ethyl acetate and the solution treated with ethereal hydrogen chloride, to yield the 1-benzyl-3-(3-dimethylaminopropylamino)-indazole dihydrochloride of the formula

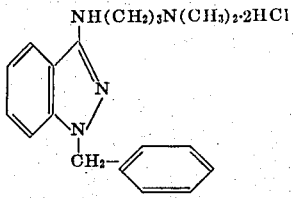

melting at 105°–106°.

EXAMPLE 3

In exactly the analogous manner as in the previous examples, one obtains the following compounds of Formula II, $R_{5,6} = H$, from equivalent amounts of the corresponding starting material:

The corresponding 1-$R_4$-3-aminoindazoles have the following characteristics:

$R_4$ = 4-methylbenzyl, m.p. 104°–106°;

$R_4$ = 4-chlorobenzyl, m.p. 134°–135°.

EXAMPLE 4

Also, in an analogous manner to the previous examples, one obtains from equivalent amounts of the corresponding starting material the 1-(4-chlorobenzyl)-3-[N-methyl-N-(3-dimethylaminopropyl)-amino]-indazole dicyclohexylsulfamate, melting at 121°–123° and the 1-(4-chlorobenzyl)-3-(N-methyl-3-pyrrolidinopropylamino)-indazole dicyclohexylsulfamate, melting at 126°–128° of the formula

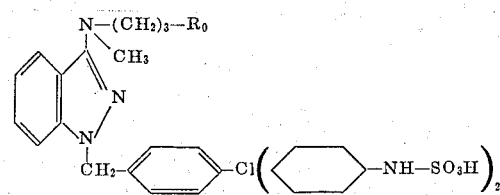

where $R_0$ is

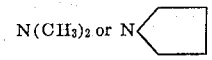

respectively.

The corresponding 1-(4-chlorobenzyl)-3-methylaminoindazole starting material is prepared as follows: The mixture of 6.5 g 1-(4-chlorobenzyl)-3-aminoindazole and 15 ml formic acid is refluxed for 45 minutes and evaporated in vacuo. Recrystallization of the solid residue from ethyl acetate gives the 1-(4-chlorobenzyl)-3-formylaminoindazole, melting at 164°–166°.

6.6 g thereof reduced with diborane in tetrahydrofuran as previously described in Example 2. After the analogous work-up, there is obtained, as an oil, the 1-(4-chlorobenzyl)-3-methylaminoindazole. It is used as such for the preparation of the above compounds.

EXAMPLE 5

Preparation of 10,000 tablets each containing 100.0 mg of the active ingredient:

| Formula: | |
|---|---|
| 1-benzyl-3-(3-dimethylaminopropyl-amino)-indazole dihydrochloride | 1,000.00 g |
| Lactose | 2,535.00 g |
| Corn starch | 125.00 g |
| Polyethylene glycol 6,000 | 150.00 g |
| Talcum powder | 150.00 g |
| Magnesium stearate | 40.00 g |
| Purified water | q.s. |

Procedure

| $R_4$ | $R_7$ | Alk | Am | Salt | Melting point, degrees |
|---|---|---|---|---|---|
| Benzyl | 2H | 1,2-$C_2H_4$ | Pyrrolidino | Cyclohexylsulfamate | 152–154 |
| Do | 2H | 1,2-$C_2H_4$ | Piperidino | do | 133–134 |
| Do | 2H | $CH_2$ | Pyrrolidino | Dicyclohexylsulfamate | 142–144 |
| Do | 2H | $CH_2$ | Piperidino | do | 137–139 |
| Do | 2H | $CH_2$ | $N(CH_3)_2$ | do | 108–110 |
| 4-methylbenzyl | 2H | 1,2-$C_2H_4$ | Pyrrolidino | do | 112–114 |
| Do | 2H | 1,2-$C_2H_4$ | $N(CH_3)_2$ | do | 132–135 |
| 4-chlorobenzyl | O | 1,2-$C_2H_4$ | do | HCl | 168–170 |
| Do | 2H | 1,2-$C_2H_4$ | do | Dicyclohexylsulfamate | 127–129 |
| Do | 2H | 1,2-$C_2H_4$ | Pyrrolidino | do | 113–115 |
| Do | 2H | 1,2-$C_2H_4$ | Piperidino | do | 118–120 |
| Do | 2H | 1,2-$C_2H_4$ | $N(C_2H_5)_2$ | di-HCl | 88–90 |
| Do | 2H | 1,2-$C_2H_4$ | $NHCH_3$ | di-HCl | 120–122 |
| Do | 2H | $CH_2$ | Piperidino | Dicyclohexylsulfamate | 133–135 |
| Do | 2H | $CH_2$ | $N(C_2H_5)_2$ | do | 114–116 |

All the powders are passed through a screen with openings of 0.6 mm. Then the drug substance, lactose, talcum, magnesium stearate and half of the starch are mixed in a suitable mixer. The other half of the starch is suspended in 65 ml water and the suspension added to the boiling solution of the polyethylene glycol in 260 ml water. The paste formed in added to the powders which are granulated, if necessary, with an additional amount of water. The granulate is dried overnight at 35°, broken on a screen with 1.2 mm openings and compressed into tablets using concave punches with 10.3 mm diameter, uppers bisected.

In the analogous manner tablets are prepared, comprising another compound of the previous examples, e.g. the 1-benzyl-3-(3-pyrrolidinopropylamino)-indazole cyclohexylsulfamate, as the active ingredient.

I claim:

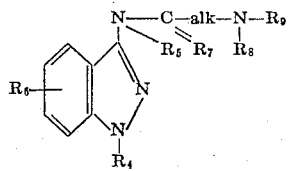

wherein $R_4$ is benzyl, (lower alkyl)-benzyl, (lower alkoxy)-benzyl, (halo)-benzyl or (trifluoromethyl) benzyl, $R_5$ is hydrogen or lower alkyl, $R_8$ is hydrogen or lower alkyl, $R_9$ is lower alkyl, or $R_8$ and $R_9$ together with the nitrogen, to which they are attached, are 5 to 7 ring-membered lower alkyleneimino, piperazino or 4-(methyl or ethyl)-piperazino, alk is alkylene of up to 4 carbon atoms, $R_7$ is oxo or 2 hydrogen atoms and $R_6$ is hydrogen or halo, or a therapeutically useful acid addition salt thereof.

2. A compound as claimed in claim 1, in which formula $R_4$ is benzyl, 4-(methyl or chloro)-benzyl, $R_5$ is hydrogen or methyl, Am is methylamino, ethylamino, dimethylamino, diethylamino, pyrrolidino, piperidino, piperazino, 4-methylpiperazino or 4-ethylpiperazino, alk is methylene, 1,1- or 1,2-ethylene, $R_7$ is oxo or 2 hydrogens and $R_6$ is hydrogen, or therapeutically useful acid addition salts thereof.

3. A compound as claimed in claim 1, in which formula $R_4$ is benzyl, $R_5$ is hydrogen, Am is dimethylamino or pyrrolidino, alk is 1,2-ethylene, $R_7$ is 2 hydrogens and $R_6$ is hydrogen, or therapeutically useful acid addition salts thereof.

4. A compound as claimed in claim 1 and being the 1-benzyl-3-(3-pyrrolidinopropylamino)-indazole.

5. A therapeutically useful acid addition salt of the compound claimed in claim 4.

* * * * *

PO-1050
(5/69)

UNITED STATES PATENT OFFICE
CERTIFICATE OF CORRECTION

Patent No. 3,725,431          Dated April 3, 1973

Inventor(s) Heinz Werner Gschwend

It is certified that error appears in the above-identified patent and that said Letters Patent are hereby corrected as shown below:

Column 11, line 18, insert --- 1. A compound having the formula ---

Signed and sealed this 30th day of April 1974.

(SEAL)
Attest:

EDWARD M.FLETCHER,JR.
Attesting Officer

C. MARSHALL DANN
Commissioner of Patents